US012604006B2

(12) United States Patent
Krug

(10) Patent No.: US 12,604,006 B2
(45) Date of Patent: Apr. 14, 2026

(54) COMPRESSION IMAGE CONTAINERS FOR COMPRESSING IMAGES

(71) Applicant: NetApp Inc., San Jose, CA (US)

(72) Inventor: Anton Krug, Carlow (IE)

(73) Assignee: NetApp, Inc., San Jose, CA (US)

( * ) Notice: Subject to any disclaimer, the term of this patent is extended or adjusted under 35 U.S.C. 154(b) by 298 days.

(21) Appl. No.: 18/539,807

(22) Filed: Dec. 14, 2023

(65) Prior Publication Data

US 2025/0203087 A1     Jun. 19, 2025

(51) Int. Cl.
| | |
|---|---|
| *H04N 19/127* | (2014.01) |
| *H04N 19/136* | (2014.01) |
| *H04N 19/154* | (2014.01) |
| *H04N 19/157* | (2014.01) |
| *H04N 19/184* | (2014.01) |
| *H04N 19/186* | (2014.01) |
| *H04N 19/187* | (2014.01) |
| *H04N 19/30* | (2014.01) |
| *H04N 19/423* | (2014.01) |
| *H04N 19/46* | (2014.01) |
| *H04N 19/80* | (2014.01) |

(52) U.S. Cl.
CPC ......... *H04N 19/127* (2014.11); *H04N 19/136* (2014.11); *H04N 19/154* (2014.11); *H04N 19/157* (2014.11); *H04N 19/184* (2014.11); *H04N 19/186* (2014.11); *H04N 19/187* (2014.11); *H04N 19/30* (2014.11); *H04N 19/423* (2014.11); *H04N 19/46* (2014.11); *H04N 19/80* (2014.11)

(58) Field of Classification Search
None
See application file for complete search history.

(56) References Cited

U.S. PATENT DOCUMENTS

| | | | |
|---|---|---|---|
| 10,360,099 B2 | 7/2019 | Subramanian et al. | |
| 10,521,143 B2 | 12/2019 | Subramanian et al. | |
| 11,036,420 B2 | 6/2021 | Thoppil et al. | |

(Continued)

FOREIGN PATENT DOCUMENTS

| | | | | | |
|---|---|---|---|---|---|
| KR | 20040049424 A | * | 6/2004 | ............... | G06T 1/00 |
| KR | 100775217 B1 | * | 11/2007 | ........... | H04N 19/426 |

OTHER PUBLICATIONS

English translation of KR-20040049424-A. (Year: 2004).*

(Continued)

*Primary Examiner* — Thomas D Lee
(74) *Attorney, Agent, or Firm* — Cooper Legal Group, LLC

(57) ABSTRACT

Techniques are provided for compressing images using compression image containers. Many user devices, such as smart phones, incorporate cameras that be utilized by users to capture photos. The photos can be either locally stored on a user device or uploaded to cloud storage. Managing the storage of a vast amount of photos is cumbersome and expensive where trillions of photos could be stored within the cloud storage. The techniques provided herein are capable of compressing images using compression image containers in order to significantly reduce storage consumed when storing images with similar or duplicate image information. Similar images are compressed together within the same compression image container for improved compression and reduced storage.

20 Claims, 14 Drawing Sheets

(56)         References Cited

U.S. PATENT DOCUMENTS

| | | | |
|---|---|---|---|
| 11,048,430 | B2 | 6/2021 | Thoppil et al. |
| 11,132,339 | B2 | 9/2021 | Kaushik et al. |
| 11,151,162 | B2 | 10/2021 | Narasingarayanapeta et al. |
| 11,210,013 | B2 | 12/2021 | Thoppil et al. |
| 11,615,001 | B2 | 3/2023 | Naidu et al. |
| 11,650,886 | B2 | 5/2023 | Mathew et al. |
| 11,853,104 | B2 | 12/2023 | Naidu et al. |
| 2014/0301652 | A1* | 10/2014 | Mese .................... G06F 16/583 |
| | | | 382/218 |
| 2019/0043201 | A1* | 2/2019 | Strong ................... G06V 10/96 |

OTHER PUBLICATIONS

English translation of KR-100775217-B1. (Year: 2007).*
"FabricPool tier management", NetApp, URL: https://docs.netapp.com/us-en/ontap/pdfs/sidebar/FabricPool_tier_management.pdf, Apr. 16, 2024, 58 pages.
"HA pair management", NetApp, URL: https://docs.netapp.com/us-en/ontap/pdfs/sidebar/HA_pair_management.pdf, Apr. 16, 2024, 26 pages.
"SVM data mobility", NetApp, URL: https://docs.netapp.com/us-en/ontap/pdfs/sidebar/SVM_data_mobility.pdf,2024, 14 pages.

\* cited by examiner

COMPRESSION IMAGE CONTAINERS FOR COMPRESSING IMAGES

TECHNICAL FIELD

Various embodiments of the present technology relate to compressing images using compression image containers.

BACKGROUND

As electronic devices have become more powerful, many electronic devices include photography capabilities. For example, a user of a smartphone can capture photos that are stored locally within storage of the smartphone as images. The images can be uploaded from the smartphone to cloud storage for low cost, long term storage. The user can also share the images with other users through social network posts, emails, text messages, etc. Trillions of photos are captured every year, which consumes a vast amount of local storage on devices, remote storage of services such as an email service or social network service, and cloud storage.

DESCRIPTION OF THE DRAWINGS

Embodiments of the present technology will be described and explained through the use of the accompanying drawings in which.

Figure 1A:
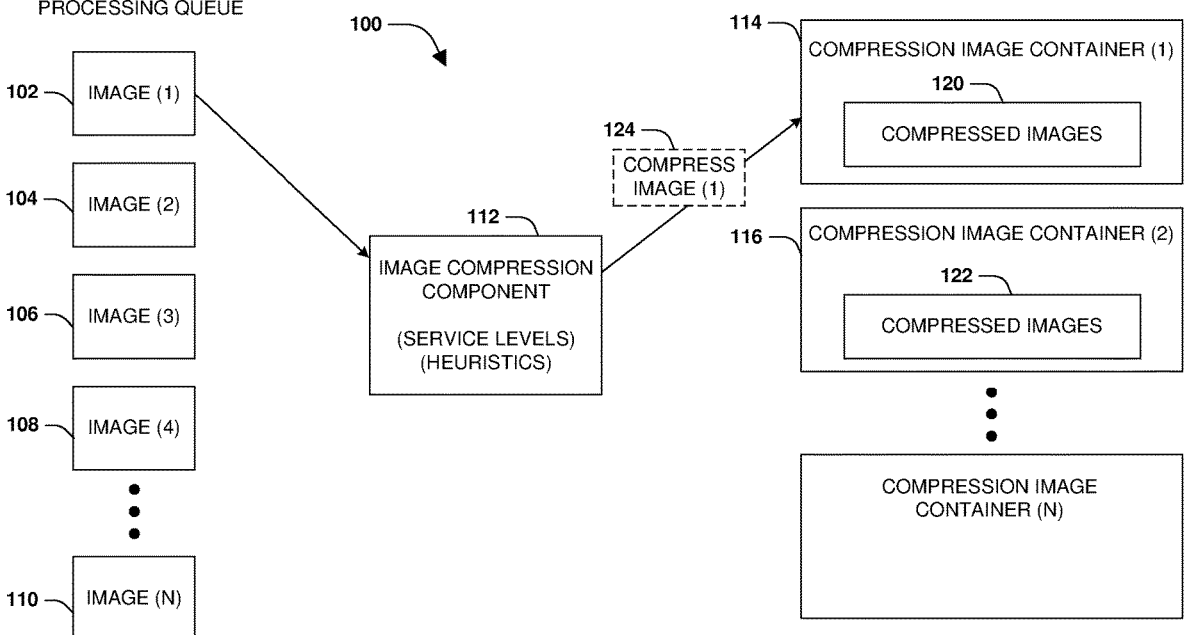
FIG. 1A is a block diagram illustrating an embodiment of a system for compressing images into compression image containers in accordance with an embodiment of the present technology.

The drawings have not necessarily been drawn to scale. Similarly, some components and/or operations may be separated into different blocks or combined into a single block for the purposes of discussion of some embodiments of the present technology. Moreover, while the present technology is amenable to various modifications and alternative forms, specific embodiments have been shown by way of example in the drawings and are described in detail below. The intention, however, is not to limit the present technology to the particular embodiments described. On the contrary, the present technology is intended to cover all modifications, equivalents, and alternatives falling within the scope of the present technology as defined by the appended claims.

DETAILED DESCRIPTION

Various embodiments of the present technology relate to compressing images using compression image containers. Trillions of photos are created and stored as images every year. Storing such a large amount of photos consumes a significant amount of local storage on the devices used to capture the photos (e.g., local smartphone storage), remote storage of services through which the photos are shared (e.g., an image sharing service), and cloud storage used to archive the images. Temporary storage of the images (e.g., a user sharing a photo through a social network post, and then later deleting a local copy of the photo) is less problematic than long term archival storage of a vast number of images that consume a significant amount of storage resources over an indefinite period of time. Many of these images are logically related such as where a series of images are sequentially captured in quick succession (e.g., a user capturing a burst of photos of a scene in order to capture the perfect shot). Logical relationships (e.g., similarities between two photos that capture the same scene within seconds or minutes of one other) could be used to identify image information that is similar amongst the images. The similar image information (e.g., redundant image data for an object depicted in the two photos) is taken into account when storing and compressing the images in order to significantly reduce the amount of storage and storage cost associated with storing similar images. Unfortunately, conventional image storage and archival techniques do not take such logical relationships into account when storing the images. Thus, a significant amount of storage space is wasted when individually compressing and storing images that are logically related.

There are many instances where images are logically related such as where photos are captured in sequence for a scene where the same objects are depicted in each of the photos. Some examples include where multiple landscape photos are captured to ensure that the focus is correct so that there can be a larger margin for errors in post processing. Each of the landscape photos may depict the same landscape objects. Burst photography, such as at sporting events, to ensure that a perfect moment was captured. A background in the photos captured by the burst photograph may remain unchanged. Portrait photos where a background and subject change slightly between each photo, but overall sequence of portrait photos remains very similar. Group events (e.g., a family gathering) where multiple photos of groups of people are taken such as to ensure that everyone smiles and no one is blinking. Macro photography where the camera and subject are at fixed positions and only the focus and depth of field change over a series of images. Medical images such as x-rays (e.g., 30 x-ray images of a person's knee or of 30 different persons' knees). Rendered still images from a computer-generated imagery (CGI) animated movie or other type of video. A clipart image gallery/library with similar images. Studio photos where a subject is fixed and only lighting changes are applied. Time-lapse photography where photos of a scene are captured over a long time with little variation between each sequential photo. Casual users taking numerous photos of a subject to get the perfect photo. High dynamic range (HDR) photograph where multiple exposures of a same scenario are captured and subsequently processed to create an HDR image where there is pixel overlap for many of the bits. Other examples include astrophotography, panning, and/or other images that have overlapping image content.

Because of the numerous instances where images have similar image information/content, storage space and costs would be significantly reduced if the similar image information could be leveraged to compress the images. However, conventional image storage techniques treat each image as a separate atomic entity. Because each image is separately/individually compressed with respect to itself and not with respect to other images, similar image information shared amongst multiple images cannot be leveraged to otherwise improve compression because such similar image information would be highly compressible. Conventional compression techniques can separately/individually compress each image such as according to lossless compression, lossly compression, or somewhere in-between. Other technologies may utilize similarities in image sequences such as to put a sequence of images into a video by reusing similarities, but will force all images into the same orientation/resolution, will lose all metadata, and each image will suffer significant degradation (e.g., quality might be sufficient for casual use and viewing, but there is no lossless results). Accordingly, there is a need for an effective mechanism for handling large quantities of images that have similar or duplicate information so that the images can be stored in a cost effective and storage efficient manner.

The disclosed techniques relate to compressing images using compression image containers. In particular, images that have similar or duplicative information (e.g., 15 images of a subject taken in rapid success where there is slight variation between each image) are grouped and compressed together into a single compression image container. Because the images, grouped into the compression image container, have similar or duplicative information, compressing the images with respect to one another will result in higher compression and storage savings compared to if the images were compressed separately/individually. The compression image containers can be leveraged for local storage or cloud storage such as for cloud archival storage of image sequences that are similar.

The compression image containers are customizable so that different types of compression and image quality can be implemented on a per-compression image container basis or a per-image basis. A user can specify a service level of desired accuracy and size constraints that can range from a fully compressed image to a lossless image, with various choices in between. In an embodiment of a service level, an almost lossless image mode of operation is selected for compressing images within a compression image container. According to the almost lossless image mode of operation, accuracy with respect to all 14-bit per color channel (or some other value such as 16-bit or other higher bit-depths) may not be guaranteed (e.g., a slightly lower accuracy per channel compared to a fully lossless image may be achieved), but the accuracy may be superior compared to typical compressed lossless images with 8-bits per color channel. Bits per color channel relate to a number of bits used to storage a color component of a single pixel. The accuracy relates to how accurately can an original image be recreated from compressed information within the compression image container, and the size constraints relate to a size of the compressed information. In this way, various customized and/or user specified service levels can be used to compress images into a compression image container in order to achieve a desired accuracy for recreating an original image and to achieve size constraints relating to how much storage savings are achieved through compression.

In some embodiments, a compression image container and/or container logic of the compression image container (e.g., an image compression component) may be implemented through a central processing unit (CPU). In some embodiments, the compression image container and/or the compression functionality may be partially or fully offloaded to a graphics processing unit (GPU). The CPU and/or the GPU may be hosted locally on a device where an image was captured, or on a remote device such as within a cloud computing environment where the image is archived. In some embodiments, the compression image container may be implemented as an intellectual property core (IP core) block inside a field-programmable gate array (FPGA) that can provide parallel task execution for compressing images into the compression image container and/or for recreating images from compression information within the compression image container. In some embodiments, the compression image container may be implemented as a dedicated application specific integrated circuit (ASIC) silicon.

FIGS. 1A-1D illustrate an embodiment of a system 100 for compressing images into compression image containers. The system includes an image compression component 112 that is configured to compress the images (e.g., images with similar or duplicate image information/content) into the compression image containers for higher compression and storage savings compared to compressing each image on an individual/isolated basis. The image compression component 112 may identify images that are available for compression, such as a first image 102, a second image 104, a third image 106, a fourth image 108, and/or other images such as an Nth image 110. The images may comprise photos, medical images such as x-ray images, rendered still images from a video such as a computer-generated imagery (CGI) animated video, clipart images, and/or any other type of imagery. The images may be locally stored on a device that captured the photos (e.g., a smartphone), a remote device (e.g., servers of a social network service through which the images have been shared), or cloud storage.

Some of the images may have similar or duplicate image information such as where some of the images include a series of photos of the same scenery taken over a short timespan (e.g., a user captures 15 photos of a monument in an attempt to get the perfect shot). Compressing images with similar or duplicate image information together within the same compression image container will result in higher compression and improved storage efficiency compared to if each image was separately/individually compressed in isolation. In some embodiments, the images may be processed by the image compression component 112 as the images are created. In some embodiments, the images may be initially queued into a processing queue for subsequently being compressed. The processing queue may be processed in response to an occurrence of a processing trigger event (e.g., a time period of low system utilization where additional resources are available to perform compression, a certain number of images being queued into the processing queue, a certain amount of time lapsing since the processing queue was last processed by the image compression component, etc.).

The image compression component 112 may evaluate the first image 102 to determine whether the first image 102 should be compressed into a particular existing compression image container or into a new compression image container, as illustrated by FIG. 1A. The image compression component 112 may utilizes pre-processing such as temporal heuristics to select a compression image container (e.g., an existing or new compression image container) for compressing the image. It may be appreciated that a variety of pre-processing may be utilized such as artificial intelligence (AI) based algorithms (e.g., a convolutional neural network), feature based algorithms (e.g., a feature detection and match algorithm that can detect the presence of features such as a nose on a face depicted by an image, and then match the nose with detected noses in other images), an algorithm the can identify similarities between images and group such images into clusters (e.g., clustering images depicting dogs and cats into a cluster depicting dogs and a cluster depicting cats), etc. The temporal heuristics may correspond to datetime heuristics such that if the first image 102 was created within a particular timespan of other images within a compression image container (e.g., within a few seconds, minutes, or hours), then the first image 102 could potentially share similar or duplicate image information with the other images within the compression image container, such as where the first image 102 depicts a similar scene or objects as the other images. In this way, the image compression component 112 may select a first compression image container 114 based upon one or more of the compressed images 120 within first compression image container 114 having creation timestamps within a particular timespan of a creation timestamp of the first image 102. Accordingly, the image compression component 112 compresses 124 the first image 102 with the other compressed images 120 within the first compression image container 114. The first image 102 is compressed according to a service level specifying accuracy and size constraints for the first image 102. Compressing images into compression image containers and reconstructed images from compressed information within the compression image containers will be subsequently described in further detail.

Figure 1B:
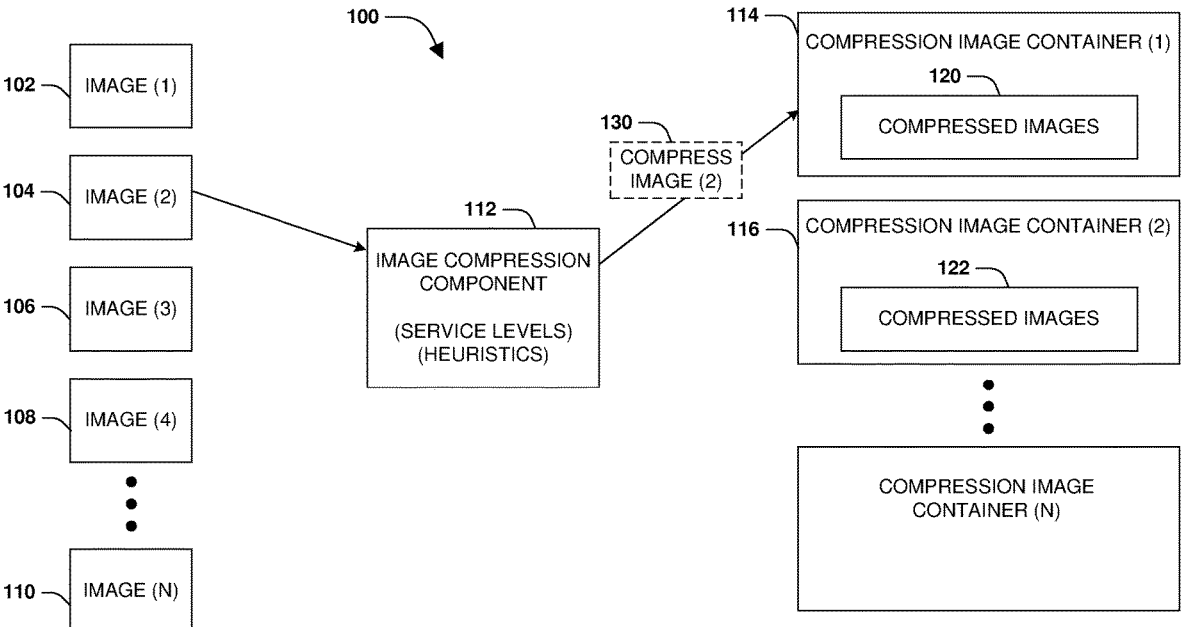
FIG. 1B is a block diagram illustrating an embodiment of a system for compressing images into compression image containers in accordance with an embodiment of the present technology.

The image compression component 112 utilizes pre-processing (e.g., AI such as convolutional neural networks, heuristics, various algorithms such as feature matching algorithms, etc.) to select a compression image container (e.g., an existing or new compression image container) for compressing the second image 104, as illustrated by FIG. 1B. For example, the image compression component 112 may select the first compression image container 114 based upon one or more of the compressed images 120 within first compression image container 114 having creation timestamps within a particular timespan of a creation timestamp of the second image 104 (e.g., the first image 102 and the second image 104 may have been sequentially captured in short succession of one another). It may be appreciated that temporal matching and timestamps is merely one embodiment, and that other matching could be performed such as feature matching (e.g., identifying a cat within an image, and then identifying other images that depict a similar cat). Accordingly, the image compression component 112 compresses 130 the second image 104 with the other compressed images 120 within the first compression image container 114. The second image 104 is compressed according to a service level specifying accuracy and size constraints for the second image 104.

Figure 1C:
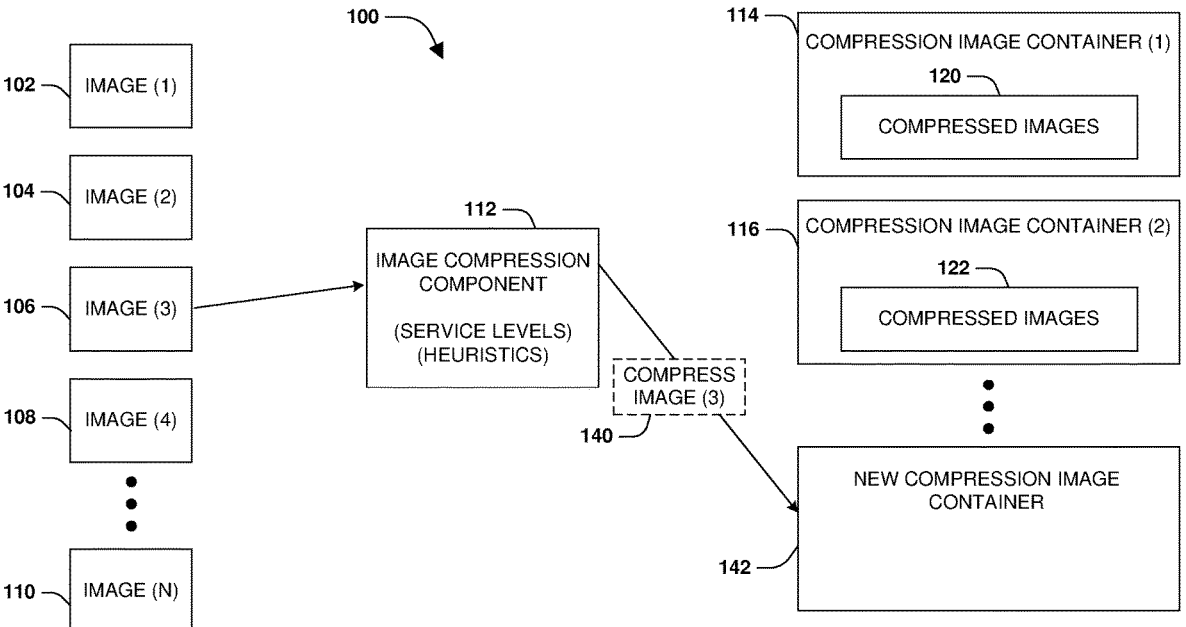
FIG. 1C is a block diagram illustrating an embodiment of a system for compressing images into compression image containers in accordance with an embodiment of the present technology.

The image compression component 112 utilizes the preprocessing to select a compression image container (e.g., an existing or new compression image container) for compressing the third image 106, as illustrated by FIG. 1C. For example, the image compression component 112 may determine that a new compression image container 142 is to be created for compressing and storing the third image 106 (e.g., the third image 106 was not created around the same/similar time as compressed images within the existing compression image containers). Accordingly, the image compression component 112 compresses 140 the third image 106 into the new compression image container 142. The third image 106 is compressed according to a service level specifying accuracy and size constraints for the third image 106.

Figure 1D:
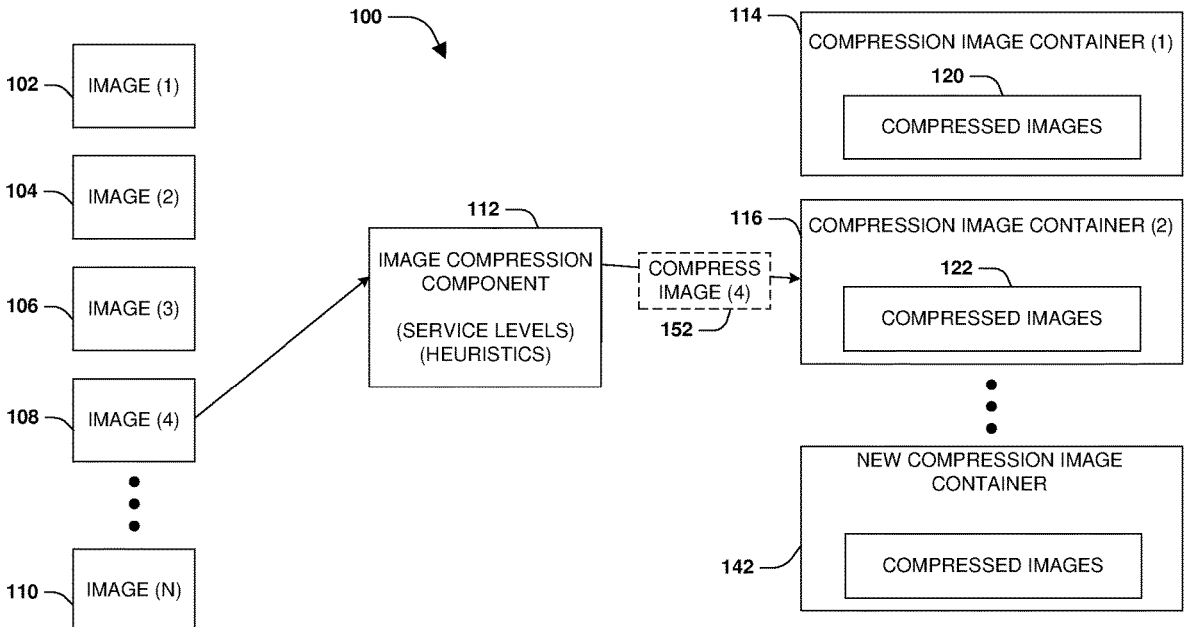
FIG. 1D is a block diagram illustrating an embodiment of a system for compressing images into compression image containers in accordance with an embodiment of the present technology.

The image compression component 112 utilizes the preprocessing to select a compression image container (e.g., an existing or new compression image container) for compressing the fourth image 108, as illustrated by FIG. 1D. For example, the image compression component 112 may select a second compression image container 116 based upon one or more of the compressed images 122 within second compression image container 116 having creation timestamps within a particular timespan of a creation timestamp of the fourth image 108. Accordingly, the image compression component 112 compresses 152 the fourth image 108 with the other compressed images 122 within the second compression image container 116. The fourth image 108 is compressed according to a service level specifying accuracy and size constraints for the fourth image 108.

Figure 2:
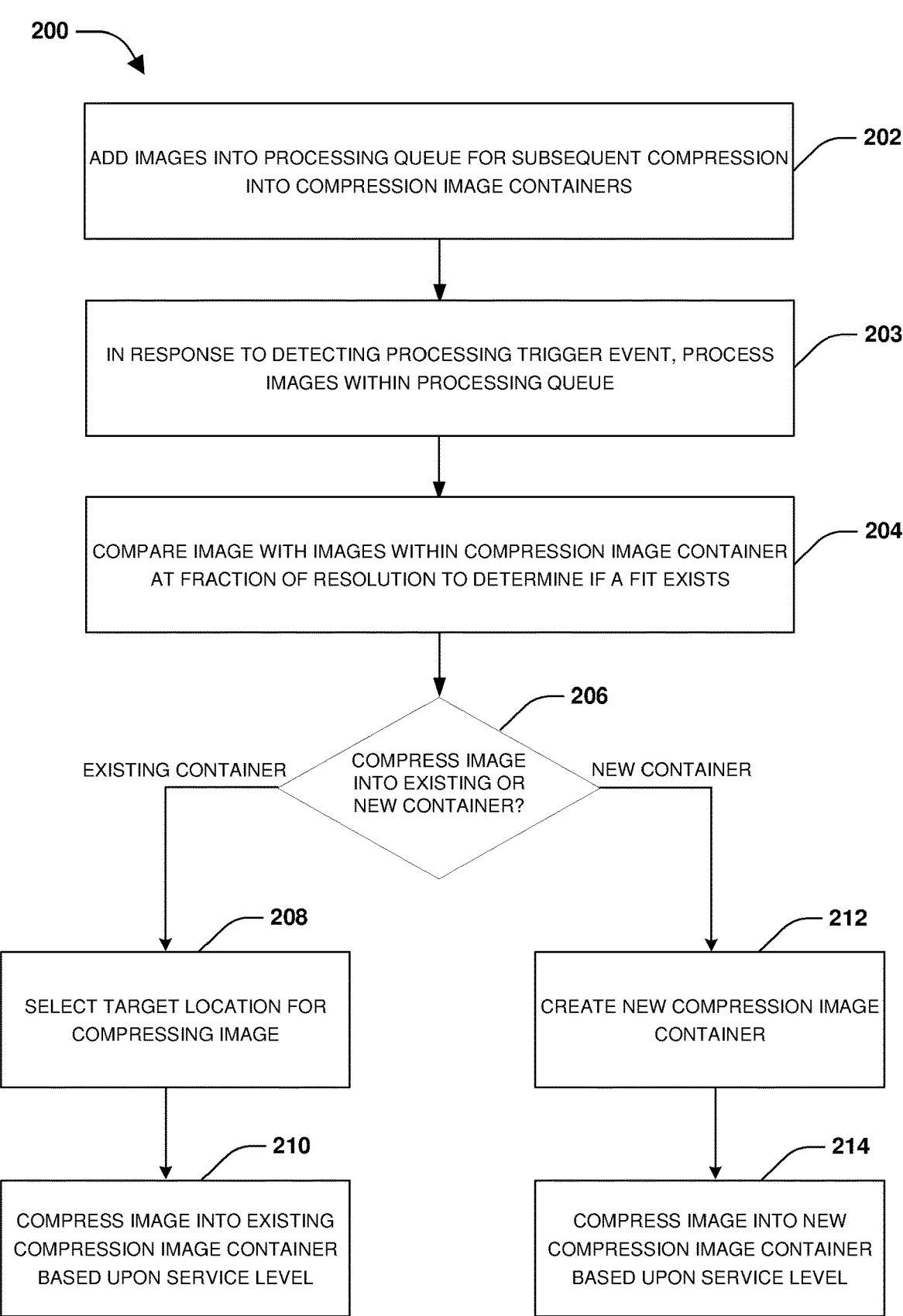
FIG. 2 is a flow chart illustrating an embodiment of a method for compressing images into compression image containers in accordance with various embodiments of the present technology.

FIG. 2 is a flow chart illustrating an embodiment of a method 200 for compressing images into compression image containers. During operation 202 of method 200, images are added into a processing queue for subsequent compression into compression image containers. In some embodiments, the images are added into the processing queue as the images are created by a device such as mobile device with a camera. In some embodiments, the images are added into the processing queue as the images are received for storage such as by a cloud computing environment. A processing triggering event may trigger the processing of the processing queue. The processing triggering event may correspond to a particular timeframe (e.g., 2:00 am when there is low system utilization), a determination that additional computing resources are available for performing compression, a certain number of images being queued into the processing queue, etc. Accordingly, in response to detecting the processing trigger event, the images within the processing queue are processed, during operation 203 of method 200.

During operation 204 of method 200, processing for an image to compress is performed. The processing may include comparing the image within the processing queue to images within existing compression image containers (container images already compressed into compression image containers) to determine if there are any container images that fit the image to compress (e.g., whether any container image has similar features and image information as the image to compress). In some embodiments, the comparison may be performed at a fraction of a resolution of the image so that the processing is lightweight.

For each image within the processing queue, a determination is made as to whether the image should be compressed into an existing compression image container or a new compression image container, during operation 206 of method 200. Pre-processing may be selected to make the determination. The pre-processing may be used to determine if compressed images within a compression image container have similar or duplicate image information with respect to the image such that compressing the image with such compressed images would result in higher compression and larger storage savings than if the image was compressed alone or with compressed images within other compression image containers.

A determination may be made that an existing compression image container is to be used for compressing the image with other compressed images within the compression image container. During operation 208 of method 200, a target location (e.g., a particular compression image container) is selected for compressing and storing the image, which may utilize at least some of the candidate compression image containers identified during operation 204 (e.g., compression image containers that store the top×best fit candidate images that are the most similar to the image to compress). In some embodiments, the pre-processing are used to select the particular compression image container. The compression image container is selected utilizing the pre-processing such as where the pre-processing indicate that compressed images within the compression image container could have similar or duplicate image information with respect to the image such as where the image and the compressed images were created within a short timespan as a series of photos capturing a scene. During operation 210 of method 200, the image is compressed with one or more images within the compression image container according to a service level specifying accuracy and size constraints for the image. The accuracy may relate to how accurate can the original image be reconstructed from compression information within the compression image container. The size constraints may relate to a desired storage size reduction for the image after compression. A service level may be user specified or may be programmatically selected. In some embodiments, a first service level may specify a fully compressed image mode for compressing the image and a first accuracy per channel. A second service level may specify a lossless image mode for compressing the image and a second accuracy per channel. A third service level may specify a partially lossless image mode for compressing the image and a third accuracy per channel. It may be appreciate that there may be any number of service levels with varying accuracy and size constraints.

It may be appreciated that various criteria may be used to select a service level such as artificial intelligence (e.g., a convolutional neural network classifier to detect selfies for greater compression than portrait photography that will have more lossless compression), temporal constraints (e.g., an older image may be compressed with a heavier compression algorithm because the older image may be less relevant; historically old photos may be compressed with lossless compression for accurate preservation), frequency of access (e.g., a more frequently accessed image may be compressed with a more lossless compression algorithm because the image may be more relevant), etc. In some embodiments, the criteria may relate to a format used by the user to initially store the image (e.g., if the image is stored in a lossless format such as PNG compared to JPG or the image is stored in RAW formats from a DSLR camera, then this is identified as an indication that the user wants to keep the image as close to lossless as possible). Multiple different criteria could be used at the same time for an image (e.g., a RAW image that depicts a portrait of a person where a user preference may be identified as keeping the image almost lossless or fully lossless). In some embodiments, a number of criteria may be selected based upon various factors such as where less criteria are used to make initial/crude decisions.

In some embodiments, an upper limit of images may be specified for the compression image container (e.g., the compression image container is constrained to storing no more than 12, 24, or some other number of images). As part of compressing the image, images previously added/compressed into the compression image container are searched for a best fit image (e.g., an image within the compression image container that is most similar to the image being compressed). Some types of compression that can be implemented are PNG, JPEG, JPEG XL, WEbP v2, AVIF, HEIF, etc. The best fit image is used as a reference for compressing the image. Referencing refers to essentially copying data from a source image to a destination image without further geometry or color transformations.

A determination may be made that a new compression image container is to be created and used for compressing the image. During operation 212 of method 200, the new compression image container is created. During operation 214 of method 200, the image is compressed into the new compression image container based upon the service level. Creating a compression image container may be performed by creating a new file binary file on an existing filesystem with corresponding file layout/headers (or merely creating a new folder where referenced images and layers are stored as separate files).

In some embodiments, images are compressed and stored within a plurality of compression image containers. A first compression level setting may be set for a first compression image container. The first compression level setting may be associated with a first compression used to compress images within the first compression image container. A second compression level setting may be set for a second compression image container. The second compression level setting may be associated with a second compression used to compress images within the second compression image container. In this way, each compression image container (e.g., a container file of one or more groups of image files) can have its own settings such as desired compression levels, and the compression level setting may be stored within the compression image containers themselves. In some embodiments, a compression level setting is specified for a volume, a folder, or at some other granularity such that after a compression image container has been created within a volume/folder with a particular compression level setting, subsequently created compression image containers within the volume/folder will inherit the same compression level setting. In this way, a dedicated archival volume is provided with desired compression and in a manner that is transparent to users that do not need to individually manage each compression image container.

Various operations may be performed during and after the compression process for an image being compressed into a compression image container. In some embodiments, a modification operation may be received for an image within a compression image container. A frequency of the image being referenced by other images within the compression image container is determined (e.g., as part of compressing an image, the image may reference another image such as a best fit image that is most similar to the image). If the image is frequently referenced (e.g., referenced by more than a certain percentage such as 40% of images within the compression image container), then the original compressed copy of the image is retained within the compression image container and a new copy of the image is created. A modification to the image by the modification operation is performed upon the new copy of the image. The original compressed copy of the image is retained because the image is frequently referenced as part of compressing other images, and such storage compression savings and/or accuracy could be reduced or lost. If the image is not frequently referenced, then the image is modified by the modification operation.

In some embodiments, a delete operation targeting an image within a compression image container is received. The delete operation may be logically implemented (e.g., deleting the image from a logical view where a user will no longer see the image as being available) and/or physically implemented (e.g., deleting the image from storage) based upon the compression level used to compress the image. If the image is compressed using a first compression level, then the image is logically deleted so that the user no longer see the image as being available, and the image is physically retained in storage because the image is compressed with other images that may rely upon image data/information of the image for being subsequently reconstructed. For example, if the image to be deleted is associated with lossy compression, then deleting the image could cause more compression artifacts. Thus, if the image is used as a reference to compress other images, then the image may be physically retained in storage, but is deleted from a logical view seen by the user. If the image is compressed using a second compression level, then the image is logically deleted so that the user no longer sees the image as being available, and the image is physically deleted from storage to free up storage space. For example, if the image to be deleted is associated with lossless compression, then it may be possible to reconstruct other images that were compressed with the image even if the image is deleted/removed from the sequence of images within compression image container, and thus the remaining images are re-compressed back into the compression image container.

In some embodiments, metadata is stored within a compression image container storing compression information of (compressed image information/data) images compressed into the compression image container. The metadata is used to decompress the images within the compression image container, such as where the compression information is used to reconstruct an image that was compressed into the compression image container. The metadata may include decoding information used to decode an image from the compression information within the compression image container (e.g., a float-point number decoder where different rounding modes may produce different numbers based upon different implementations of the float-point number decoder; an integer-based decoder; decoding information for a specific format used for a specific image file that is compressed into an FPGA compute implemented compression image container, etc.). The metadata may comprise accuracy infor mation (e.g., lossly compression, lossless compression, etc.), a speed setting (e.g., precision floating point numbers may have a different speed/accuracy than using fixed point math emulated through regular whole number integer math, such as fast-decode compared to precise-decode which needs to be captured and kept consistent to prevent over-correcting and other issues if the produced errors are not the same as what is expected), a global setting for a compression feature used to compress the image (e.g., an exponential equation for a "gray-non-linear" feature used in regions that may be overlaid by referenced blocks), etc.

In some embodiments, adjustment layers are utilized to reconstruct an image compressed into a compression image container such as for providing a user with access to the image. In some embodiments, one or more adjustments layers are applied to the image to incrementally recreate a reconstructed image of the image. Each adjustment layer may add or remove image content from the reconstructed image (e.g., the adjustment layers are used to make major and/or minor adjustments/tweaks to the image being constructed). For example, an adjustment layer is used to add or remove an existing compressed image within the compression image container to the image being reconstructed (e.g., each adjustment layer may add or subtract from an image based upon different algorithms). In some embodiments, an adjustment layer is used to perform referencing (e.g., portions of an image that reference similar/same portions in a reference image), geometry changes (e.g., image rotation, flipping, skewing, change of perspective, change of ratios and grid-based equation-driven distortion such as mesh-grid, etc.), and/or transformations (e.g., performing a per-pixel value transformation) to create the reconstructed images.

In some embodiments, a procedural adjustment layer is applied to the image to create the reconstructed image. The procedural adjustment layer is applied to execute an algorithm or script for creating the reconstructed image. In some embodiments, the procedural adjustment layer is associated with a hard coded common algorithm, such as various pseudo-noise generators that rectify issues such as banding. The pseudo-noise generators have seed values and initial state settings that are provided through the procedural adjustment layer to ensure that a generated result for reconstructing an image is deterministic even if the generated results could potentially look random to an end user. Furthermore, custom interpreted scripts (e.g., GPU shaders and LUA scripts) may be used, instead of relying upon a container implementation, to contain algorithms used to reconstructing the image. This allows the compression image containers to be more future proof as new enhancements can be separately implemented as scripts.

In some embodiments, a reference, from the image to one or more other images within the compression image container that a smaller index than the image, may be applied to the image. Also, the image may reference itself with an adjustment layer and the one or more images that have the smaller index. In particular, an image may reference itself with a particular adjustment layer and images associated with the smaller index. However, the image may be restricted from referencing itself with images associated with bigger indexes in order to avoid cyclic references (e.g., an image can only reference prior images within a sequence of images, and not images that occur after the image in the sequence). The compression image container can utilize different orderings of images, and may selectively utilize an order that could further decrease a container size of the compression image container. While storing the image with the highest index value may still allow a new image to take advantage of all the existing references from existing images within the compression image container, however, the image may not become a reference to itself for any previously added images within the compression image container.

In some embodiments, a reference may be applied to the image to reconstruct shadows, reflections, and/or other objects based upon a transfer adjustment layer. Self-referencing, even with a single compression image container, can reduce storage consumption. People and objects can cause reflections and shadows which may be reconstructed from the original image after applying one or more adjustment layers and transformations.

In some embodiments, the image is reconstructed by increasing a bit-depth resolution for the image (e.g., a resolution larger than resolutions expected or supported by a destination requesting the image such as where merely a few extra bits may be added). A smoothing process is performed to smooth out dithering into one or more color values by using high-frequency low-amplitude filtering in a frequency domain. The image is compressed at a higher compression rate. Any larger rounding errors and compression artifacts at this bit-depth will be scaled down to a lower bit-depth with post-process dithering that may be applied on the decoding side. As the dithering can be treated similar to noise, having high noise levels due to the high compression rate can be desired in some instances. Compressing smother non-dithered transitions is much more compression-friendly and produces improved compression. The image is scaled down from the higher bit-depth to a lower bit-depth, which produces error deltas for each pixel. An error delta value represents a difference between an ideal high bit-depth value compared to a real value that is possible to display on a destination device. A script is executed to address/consume the error deltas and produce minute alterations to the lower bit-depth image. This will allow post-process decode dithering, other noise functions, and smoothing algorithms to evolve and expand the life-span of the compression image container without having to update the compression image container implementation itself.

Figure 3:
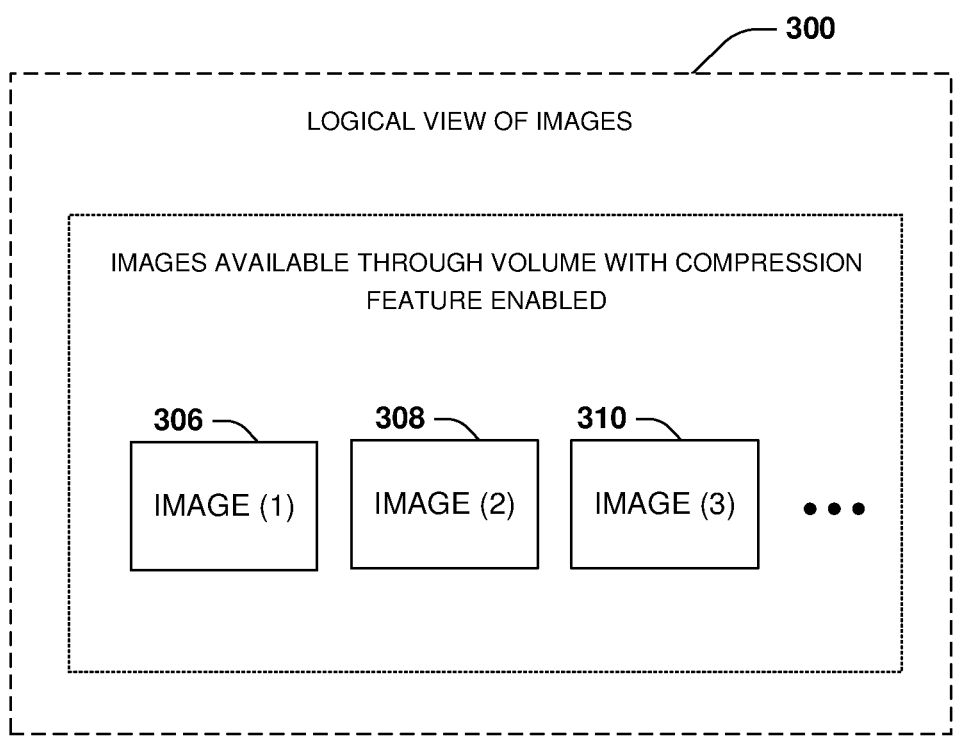
FIG. 3 is a block diagram illustrating an embodiment of a logical view of images in accordance with an embodiment of the present technology.

FIG. 3 is a block diagram illustrating an embodiment of a logical view 300 of images. A user may be provided with the logical view 300 in order to view images available for the user to access. The logical view 300 may be populated with images available to the user through a volume that has a compression feature enabled where the images are compressed into compression image containers. In some embodiments, the logical view 300 is populated with a first image 306, a second image 308, a third image 310, and/or other images that may or may not be compressed into compression image containers.

Figure 4A:
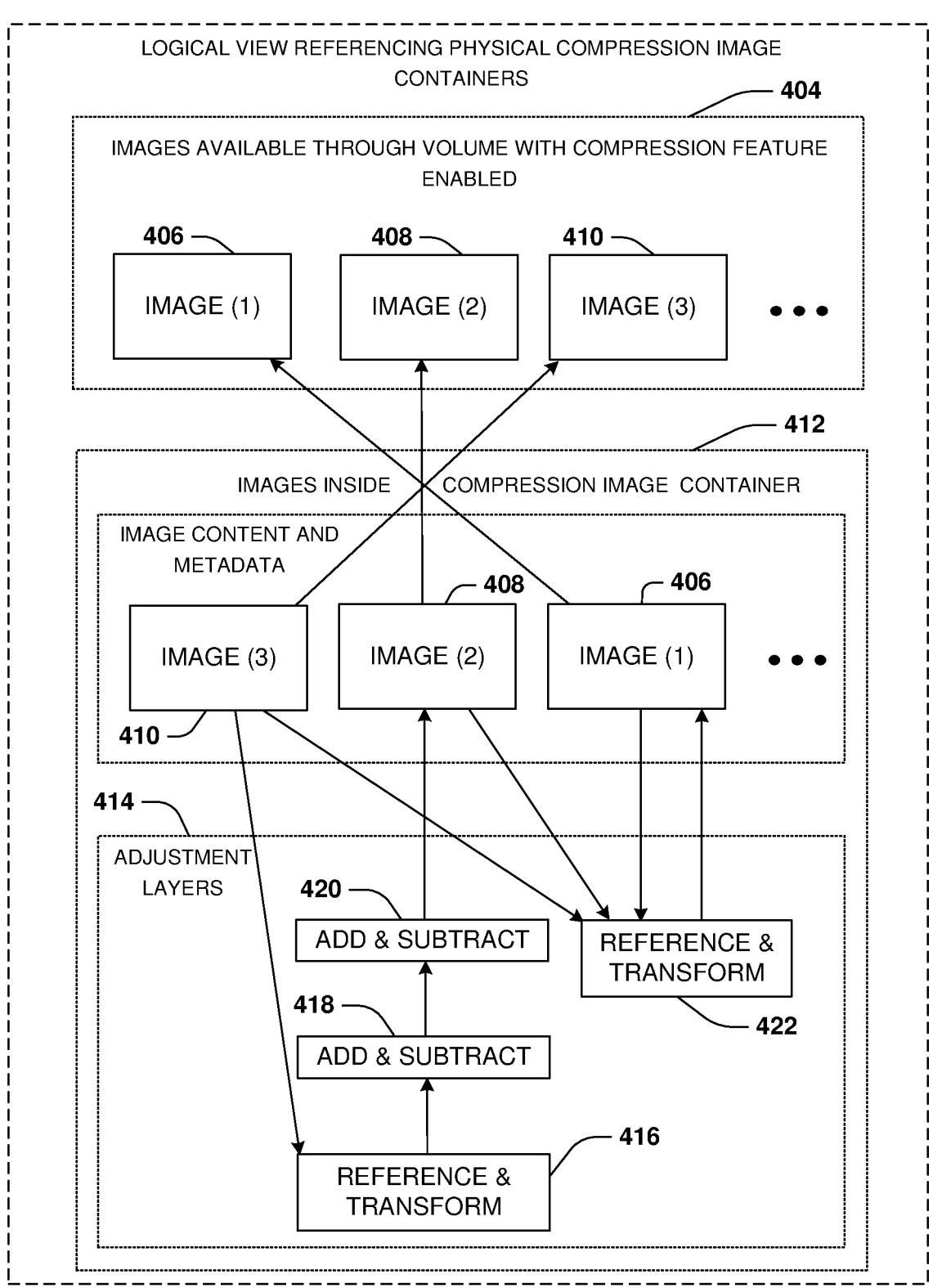
FIG. 4A is a block diagram illustrating an embodiment of logical view referencing physical compression image container(s) and a compression image container into which the images are compressed in accordance with an embodiment of the present technology.
Figure 4B:
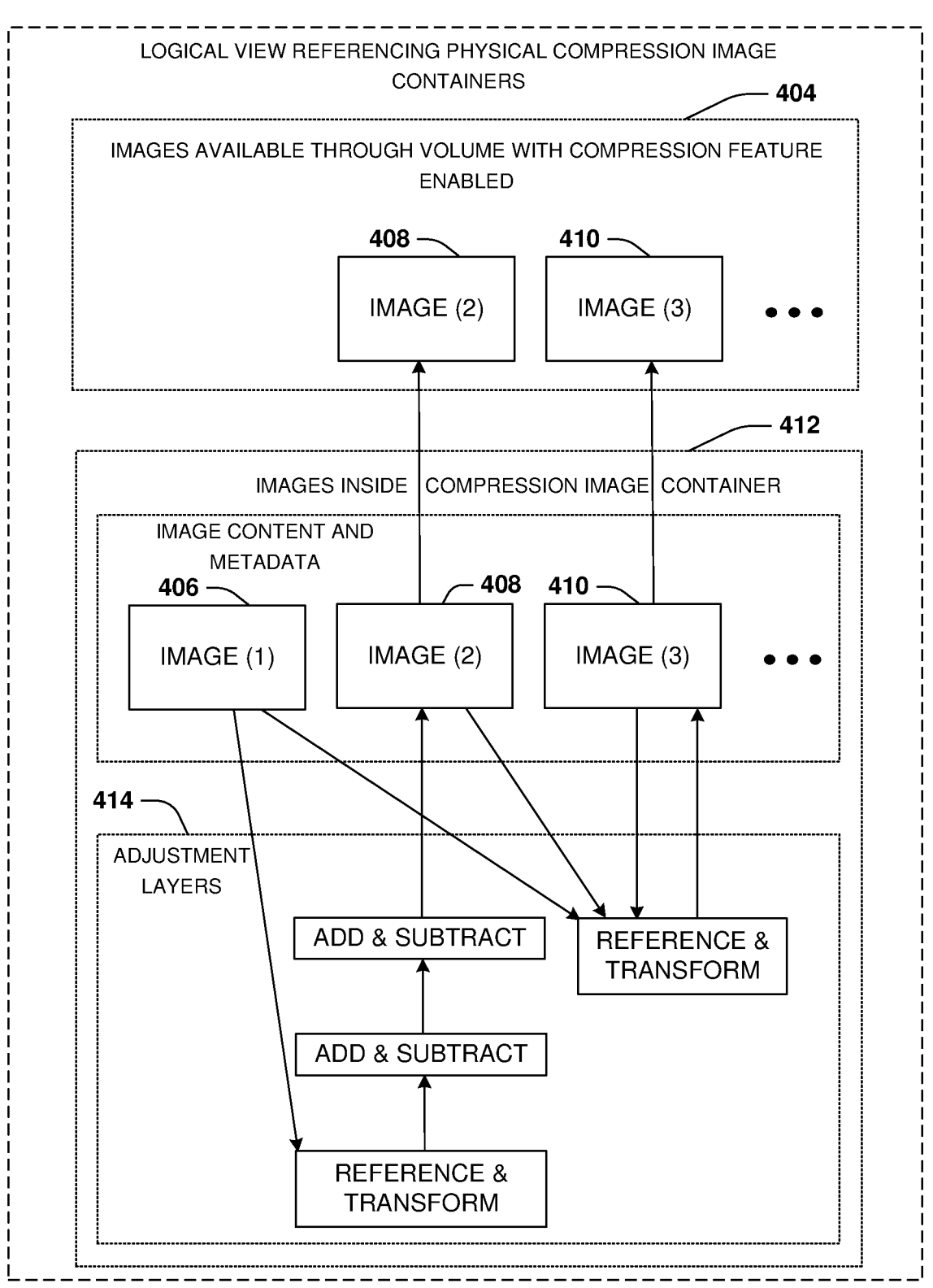
FIG. 4B is a block diagram illustrating an embodiment of an image being deleted from a logical view of images in accordance with an embodiment of the present technology.

FIGS. 4A and 4B are block diagrams illustrating an embodiment of a logical view referencing physical compression image container(s) and a compression image container 412 into which the images are compressed. As illustrated by FIG. 4A, the logical view of images includes images available through a volume with a compression feature enabled such as a first image 406, a second image 408, a third image 410, and/or other images that have been compressed into one or more compression image containers. The images may be compressed into a compression image container 412. The compression image container 412 includes the first image 406, the second image 408, and the third image 410 in a compressed state (e.g., stored as compress image information/data). The compression image container 412 includes adjustment layers 414 that can be used to reconstruct the images. For example, the adjustment layers 414 may utilize the third image 410 to perform reference and transformations 416, additions and subtractions 418, and/or additions and subtractions 420 for reconstructing the second image 408. The adjustment layers 414 may utilize the third image 410 and the second image 408 to perform reference and transformations 422 for reconstructing the first image 406.

In some embodiments, a delete operation may be implemented to delete the first image 406, which is deleted from the logical view, as illustrated by FIG. 4B. However, the first image 406 may have been retained in physical storage because the first image 406 is already referenced by other images such as the second image 408 and/or the third image 410 that reference the first image 406). Accordingly, the first image 406 is retained within storage even though the first image 406 is removed from the logical view such that the user no longer sees the first image 406 as being available (e.g., similar to an operating system recycle bin).

Figure 5:
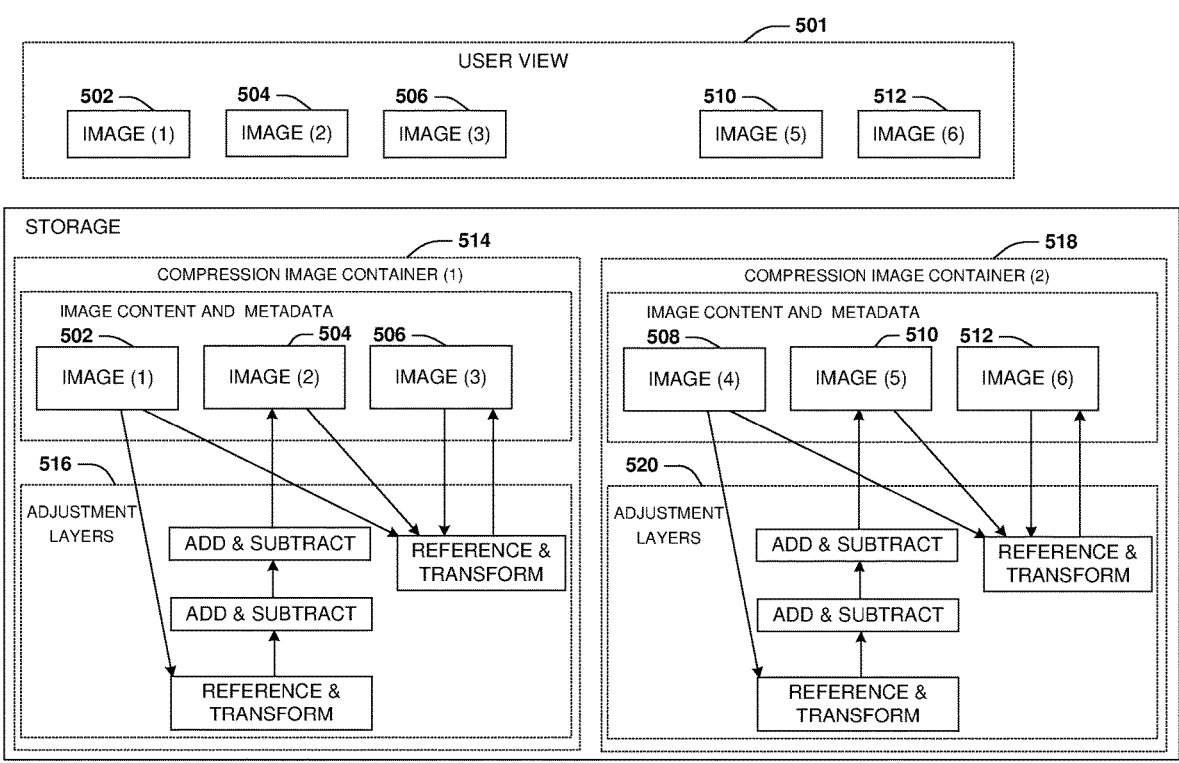
FIG. 5 is a block diagram illustrating an embodiment of a logical view of images and compression image containers into which the images are compressed in accordance with an embodiment of the present technology.

FIG. 5 is a block diagram illustrating an embodiment of a user view 501 of images (e.g., a logical view of the images) and compression image containers into which the images are compressed in accordance with an embodiment of the present technology. A user may be able to view a first image 502, a second image 504, a third image 506, a fifth image 510, and a sixth image 512 through the user view 501 (logical view). A first compression image container 514 and a second compression image container 518 may be stored within physical storage. The first image 502, the second image 504, and the third image 506 may be stored within the first compression image container 514. The first compression image container 514 may include adjustment layers 516 used to add or subtract from images, perform transformations, and/or track references amongst images used for reconstructing the images from the first compression image container 514. For example, the first image 502 may be referenced by the second image 504, and are thus used by the adjustment layers 516 to reconstruct the second image 504. The first image 502 and the second image 504 may be referenced by the third image 506, and are thus used by the adjustment layers 516 to reconstruct the third image 506.

A fourth image 508 (e.g., deleted from the logical/user view 501 but retained in the storage), the fifth image 510, and the sixth image 512 may be stored within the second compression image container 518. The second compression image container 518 may include adjustment layers 520 used to add or subtract from images, perform transformations, and/or track references amongst images used for reconstructing the images from the second compression image container 518. For example, the fourth image 508 may be referenced by the fifth image 510, and are thus used by the adjustment layers 520 to reconstruct the fifth image 510. The fourth image 508 and the fifth image 510 may be referenced by the sixth image 512, and are thus used by the adjustment layers 520 to reconstruct the sixth image 512.

Figure 6:
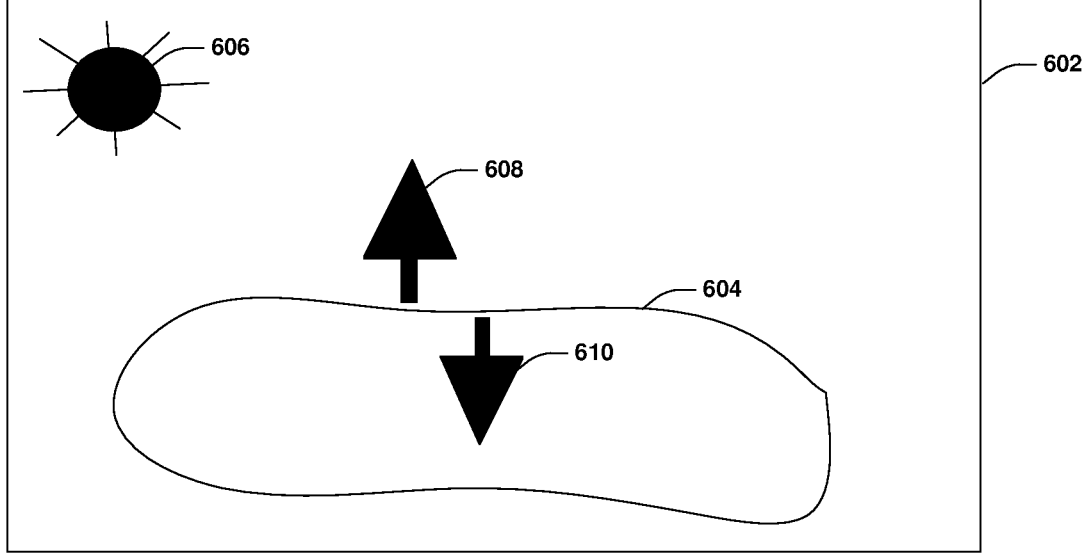
FIG. 6 is a block diagram illustrating an embodiment of an image with reflections in accordance with an embodiment of the present technology.

FIG. 6 is a block diagram illustrating an embodiment of an image 602 with reflections. The image 602 may depict a scene with a sun 606, a tree 608, a lake 604, and a shadow 610 of the tree 608. When the image 602 is compressed into a compression image container, the image 602 may reference itself such as by utilizing an adjustment layer to self-reference the shadow 610 based upon the tree 608 for compressing the image 602 into a compression image container.

Figure 7:
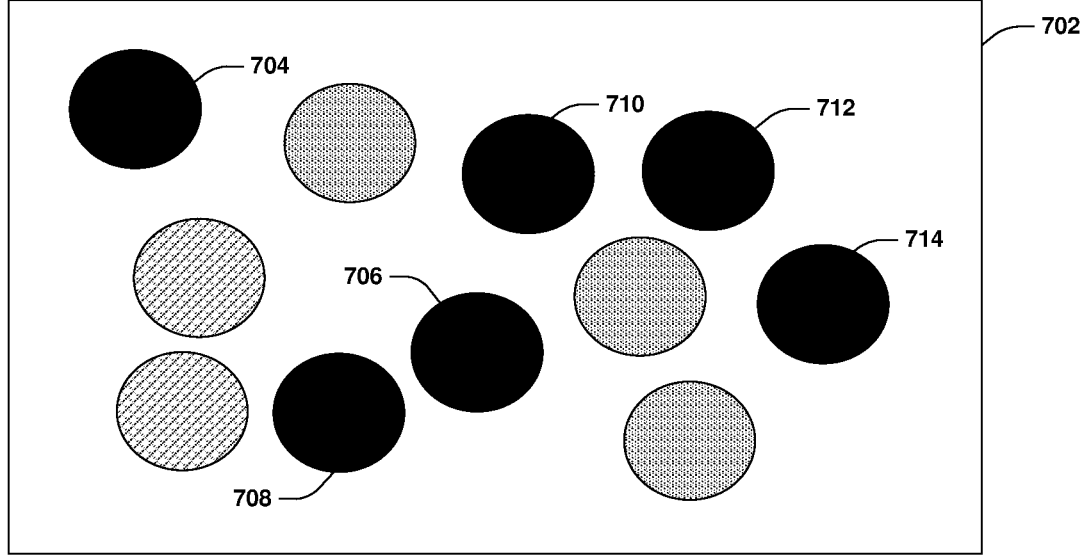
FIG. 7 is a block diagram illustrating an embodiment of an image with similar repeating objects in accordance with an embodiment of the present technology.

FIG. 7 is a block diagram illustrating an embodiment of an image with similar repeating objects. The image 702 may depict a scene with multiple different colored balls. Some of the balls may have the same or similar color and/or shape, such as a first ball 704, a second ball 706, a third ball 708, a fourth ball 710, a fifth ball 712, and a sixth ball 714. Because these balls have the same or similar color and/or shape, the image 702 may reference itself such as by utilizing an adjustment layer to self-reference the balls with respect to one another for compressing the image 702 into a compression image container.

Figure 8:
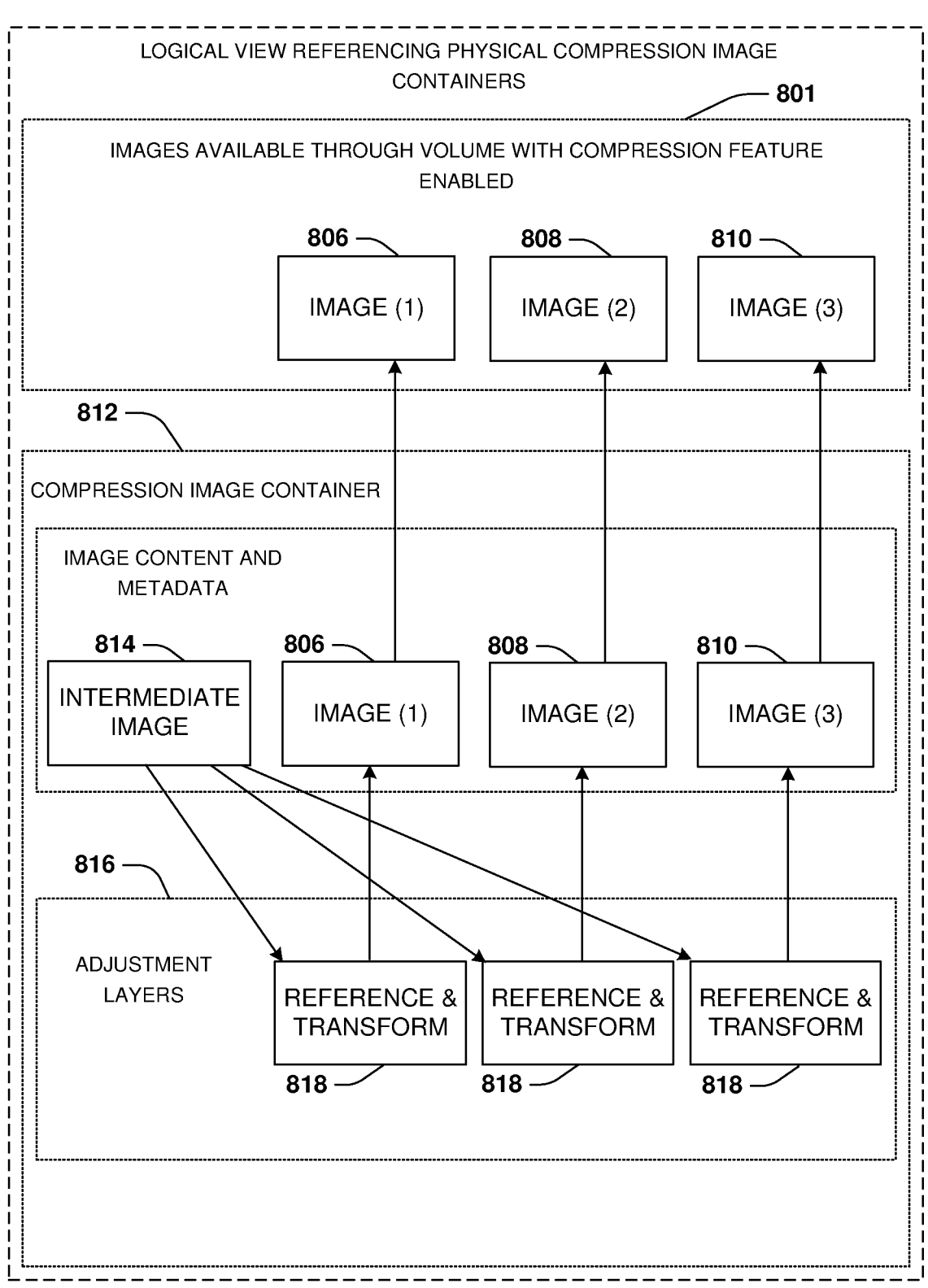
FIG. 8 is a block diagram illustrating an embodiment of a logical view referencing physical compression image container(s) and a compression image container within which the images are compressed in accordance with an embodiment of the present technology.

FIG. 8 is a block diagram illustrating an embodiment of a logical view referencing physical compression image container(s) and a compression image container 812 within which the images are compressed. A first image 806, a second image 808, and a third image 810 may be visible to a user through the logical view, and may be compressed into the compression image container 812. Adjustments layers 816 may be used to utilize references and transformations 818 to reconstruct the images. The adjustment layers 816 may utilize an intermediate image 814 for the reconstruction. However, the intermediate image 814 is not made available to the user, and is excluded from the logical view 801.

In some embodiments, a compression image container is implement as a container. The container is a data structure used to contain various types of data together such as image and compression information. In some embodiments, the container is used to bundle together different types of metadata and data without focusing on the specific or exact algorithms of such (e.g., a compression algorithm used to compress image data/information together). The images within the compression image container are bundled together as a collection of similar images that can be self-referencing and built up in layers (e.g., utilizing adjustment layers). Because the algorithms for compressing and/or reconstructing images is agnostic and not bound to a particular compression image container, the algorithms can be updated (e.g., adjustment layers may be updated/improved) without having to modify the container structure of the compression image container.

In some embodiments, a compression algorithm (e.g., a JPG-like or similar compression algorithm) may be utilized to obtain a base layer with approximate values for an image (e.g., even if a block/section is being referenced from a different image), and then additional layers are overlayed on top. Some of the additional layers may provide improved filtering (e.g., filtering of JPG-like artifacts). In some embodiments, each image is not built from scratch, but similar/overlapping information is used to reconstruct an image, and corrections (e.g., using adjustment layers) are applied as necessary to reconstruct the image according to an accuracy that satisfies how the image is to be used (e.g., fulfilling end user requirements depending on a compression level that was selected). One of the adjustment layers may be implemented through artificial intelligence that has been trained for generative content or trained for filing JPG artifacts, which may utilize additional compression algorithm layers (adjustment layers) focused on removing low amplitude and high frequency noise and leftovers. With layers that are driven by artificial intelligence, the compression image container is configured with what information is needed to make the output from the compression image container deterministic (e.g., a unique identifier of a model and required input parameters to the model such as a seed number). In this way, the model can be stored separate from the compression image container, and merely references the compression image container in order to obtain the output from the compression image container. In this way, the compression image container can evolve and expand without having to reconstruct the compression image container itself.

In some embodiments, a user may capture two images of a scenery depicting a hill. The images may be uploaded to a cloud image archival volume that does not have a compression feature enabled (e.g., a compression image container format for storing images within the cloud image archival volume is not enabled). In response to a processing trigger event being detected (e.g., off-peak times), similarities between images within the cloud image archival volume may be detected. Images that are similar with respect to image content (e.g., the two images of the same scenery) are compressed into the same compression image container. The first image may be compressed on a first layer with JPEG compression as a whole image. An AI smoothening layer could be applied to remove noise/JPEG artifacts. A difference algorithm (e.g., PNG) may be applied to remove leftover artifacts in order to obtain an image as close to the original first image as possible based upon a setting (e.g., lossless compression, almost lossy compression giving a best yield compared to lossless results, etc.). It may be appreciated that other algorithms may be utilized (e.g., a free lossless image format). In some embodiments, a very efficient lossy algorithm is used to get the image to 95% of the original image (or some other percentage), and then a less efficient algorithm (e.g., a lossless algorithm) is performed to reconstruct the last 4% to 5% of the original image (or some other percentage).

For the second image, existing previously compressed images are searched for good matches/fit (e.g., images that are similar with respect to image content such as with similar/overlapping information). Translation with respect to position, scale, mirroring, rotation, and/or color translation may be performed. Because the first image may be similar to the second image, the first image and the compression image container into which the first image is compressed may be identified. After the compression image container is identified, differences between the second image and a reference image (e.g., a best fit/most similar image such as the first image) is encoded with compression such as JPG that is efficient because similar sections of the images are turned into an easily compressible color such as black/gray so that bits are merely used on pixels (and sections/blocks of pixels) that are unique between the first image and the reference image (e.g., pixels that are vastly different to the previous sequence of images and a new/next sequence of images within different compression image containers). In some embodiments, AI filtering may be performed to remove bulk from compression artifacts. Merely an AI model/algorithm ID and input parameters are stored with the compression image container, and are used to call/invoke an external AI model/algorithm to perform the AI filtering. In some embodiments, a less efficient but more accurate algorithm may be used to obtain the second image that is as close as possible to the original second image, while using image information referenced and reused from the reference image such as the second image.

In some embodiments, medical images such as digital x-ray images are compressed into compression image containers. Digital x-ray images need to capture energy levels as close as possible to real energy levels, which may be referred to as bit depth. The higher the bit-depth of a digital image, the more accurately the digital image will capture real values of energy levels (e.g., higher bit-depth images are more desirable than 8-bit images). Typical images/photos have 24-bits of color (or 32-bits if an extra alpha channel is stored), but have 3 (or 4) channels that use 8-bits per channel. An x-ray is a single channel (e.g., gray colors vs RGB colors), and thus a 12-bit x-ray image has more information per channel than a regular 24-bit RGB image. Higher bit-depth is also utilized in other types of imaging such as images fed into a computational storage such as for 2D-3D registration where multiple 2D projection radiography images are used to compute 3D volume, or for computed tomography scans. The disclosed compression image containers provide more efficient ratios for storing these types of images with high fidelity and little to no compression artifacts Because self-similar images and images that are similar with respect to one another (e.g., 15 images of a person's knee) will be automatically identified, the images can reference each other to build up a base of the image in order to obtain an image/object with adequate accuracy/quality, while using additional layers of each image are used to get the values of each pixel to perfect lossless values without having to encode all overlapping and redundant information. This saves on cost and storage requirements while providing high fidelity images exactly as raw images.

In some embodiments, even x-ray images of different people might be similar enough for the images to be able to use many references (with some transformations applied). Even if additional layers are used to obtain a bit perfect result, similar references as base images (after transformations are applied) can be used, and merely the differences can be encoded instead of encoding all the image data from scratch each time.

Depending on a use case, some images with long-term storage requirements might be moved to a volume having an almost lossless compression setting, which would allow even further compression gains and better cost savings. For example, if images are to be stored at 14-bit depth, then 1 or 2 bits of error might be acceptable depending on how much losslessness of the images is acceptable, and an end user can selectively decide which images are to be retained at a perfect lossless compression settings.

In some embodiments, compression is enabled at a per subscription/volume level. Each container file (e.g., a group of image files) can have settings such as a desired compression level, which are stored within the compression image container. In some embodiments, the compression level can be specified at a folder-level granularity where if a first compression image container is created with a particular compression level and/or other settings within a folder, then other compression image containers, subsequently added to the folder, will inherit the same compression level and/or settings. In some embodiments of processing images for compression, low computational heuristics (e.g., identifying images with similar date-time metadata) is performed before performing more compute-intensive image similarity matching. Users are capable of reading images at any point in time regardless of the compression processing stage of the images. Images are displayed to a user as atomic independent files while the images are compressed into a compression image container. The number of images within a compression image container maybe constrained to a particular number such as a few dozen images in order to limit computational expense that would be incurred from having too many images in a single compression image container.

For each image added into a compression image container, various additional metadata may be included. The metadata may comprise various global setting for features such as an exponential equation for a gray-non-linear feature used in regions that may be overlaid with reference blocks (e.g., a compressed image may reference blocks of other images that are the same/similar as blocks of the compressed image). The metadata may comprise details on how images are decoded and what accuracy and speed settings were used to compress the images. For example, floating-point number decoders may be accurate, but are not portable because different hardware may have different implementations (e.g., different rounding modes) that could produce different results/numbers. However, an integer-based decoder may be portable and able to generate the same output for any computing platform. The metadata captures decoding logic decisions for a specific container/compression format so that the same decoder can be used to decompress the images.

In addition to compression image containers, adjustment layers are provided for making major and minor adjustments/tweaks to images in order to incrementally reconstruct images to be similar to the original images, which may be dependent on the compression utilized. That is, enough adjustment layers may be utilized in order to reconstruct an image (e.g., a compressed image within a compression image container) with desired detail of an original image before compression.

Any number of adjustment layers may be utilized for each image. Each adjustment layer adds or subtracts an image based upon various algorithms. One algorithm may be tailored for high frequency low amplitude inputs to improve accuracy of details at the noise level. Another algorithm may be suitable for low frequency high amplitude inputs to provide base rough levels of details and colors. Therefore, a plurality of adjustment layers are implemented for enabling reconstruction of an image as close to the original image as desired, which may be selected by the desired compression level. Hence, a particular algorithm is selected and used when utilization of the algorithm is beneficial, and could be tailored to target merely parts of an image where the largest benefit would be achieved (e.g., the largest amount of compression can be achieved such as for the same objected depicted in two images). Because the structure of the compression image containers is agnostic to the inner workings of the plurality of adjustment layers, the disclosed techniques allow easy extensions to support new algorithms with new adjustment layer types.

In some embodiments, an adjustment layer is utilized for referencing and transformations. In particular, the adjustment layer performs changes associated with geometry, such as: rotation, flipping, skewing, change of perspective, change of ratios and grid-based equation-driven distortions (such as mesh-grid). The adjustment layer is further used for performing a per-pixel value transformation. In some embodiments, an equation based per pixel equation may be implemented, which provides the ability to describe a non-linear transfer, such as a non-linear darkening of an image that could be caused by high dynamic range after effects (HDR AE) bracketing or cloud, thus causing sudden shadow in some area of the image. Further, a polynomial curve fitting can be used as a transfer function by the adjustment layer. However, the transfer function may not be limited to polynomials. Per-pixel transfers may be able to do various transformations, not just the brightness, for example, in hue color shift and saturation changes.

In some embodiments, kernel-based transformations that support various kernels (e.g., 3×3, 5×5, 10×10, etc.) are used to easily enable various types of filters such as sharpen and blur without having to embed the filters into container logic of the compression image containers. In this manner, a compression image container may execute a kernel matrix each time in the same way, and matrix values may be provided in the adjustment layer to achieve various effects and filters.

In some embodiments, the plurality of adjustment layers may further include procedural adjustment layers, which are associated with hard coded algorithms. For example, various pseudo-noise generators may be used, which rectify issues such as banding issues. A generator has a seed value and initial state settings provided by a procedure adjustment layer to assure that a generated result is deterministic even if the generated result could appear random to an end user. Further, custom interpreted scripts (e.g., GPU shaders or LUA scripts) may be used to contain any algorithms instead of relying on a container implementation of a compression image container. In this manner, the scripting may allow the compression image container to be subsequently modified/upgraded such as with newer enhancements, which may be implemented as external scripts hosted outside of the compression image container.

Furthermore, an image may reference itself through an adjustment layer and images that are associated with a smaller index than the image. However, the image may be restricted from referencing itself with images associated with bigger indexes in order to avoid cyclic references (e.g., an image may only reference prior images of an image sequence within a compression image container, not subsequent images compressed into the compression image container after the image). Container logic of a compression image container can identify a different ordering of the images, which may further decrease a container size of the compression image container. Storing the image with a highest index value allows a new image to take advantage of all the existing references from existing images within the compression image container.

The image may reference itself in order to reconstruct shadows and reflections based on transfer adjustment layers and possibly other adjustment layers such as to correct for minor discrepancies. Self-referencing, even with a single compression image container, can produce size reductions. In an example, people and objects can cause reflections and shadows which may be reconstructed from the original image after applying enough adjustment layers and transformations. This may be performed by a device that captures the images or may be performed offline (e.g., by a server or different device) due to computational intensity. It may be appreciated that the process of the image referencing itself is not limited to shadows and reflections, and could be reused on similar objects and repeated shapes in the images.

In some cases, the original image may partially act as a simple "add and subtract" adjustment layer. A void area for no adjustment may correspond to any colors or gradients, which may cause minor or no compression artifacts around the area. A "black for no adjustment" area may be similar to the void area, but may be less computationally intensive. A "gray-linear" area, where a middle gray value acts as zero, lighter values will add up from the reference, and darker values will subtract from the reference. A "gray-non-linear" area which may behave like 'gray-linear' area, bigger than the middle value will add up, and lower than the middle value will subtract. However, the values are exponential equation, which is set per image file or per subsection of the image. Allowing the edge cases to override the white levels of a referenced image into black levels is at the cost of losing accuracy, and it can have a range similar to the 'gray-linear' range, while providing sub-bit accuracy at low to middle values. Extra bits of accuracy are useful when referencing existing image blocks and/or adding multiple layers together and trying to correct accumulated rounding errors.

In some embodiments, internal intermediate constructed images are not displayed directly to a user, but only through referenced images. The internal intermediate images may differ from original images in various ways. For instance, the internal intermediate images may contain more bits per pixel. For HDR images, multiple images where the camera and content were stationary, are merged, but these images may be taken at different exposures (such as AE bracketing). Long-exposure or same exposure images are considered for lowering the noise levels (such as astrophotography image stacking). With respect to dithering smoothing, a typical 8-bit per channel may produce 24-bit (16 million) colors, which may not be sufficient such as when making smooth gradients to colors that can cause visible banding artifacts. Additionally, perceived luminosity and colors are not linear. To compensate, non-linear curves are applied, which, for some colors, produce even less color resolution. Often, gradients are not from pitch black to maximum white, but rather from mid value to mid value, thus shrinking the number of colors even more. Despite having 16 million colors, there might be only a handful of values spread over hundreds of pixels, making visible banding artifacts. To solve this issue, dithering may be applied for making smooth transitions even across large regions. An image may be using the same colors, but are being dithered for a smoother transition. Many more perceived colors can be faked with dithering even when the same number of colors is used. The number of colors of an image may be the same, but the dithering noise is good at faking a smooth transition to the human eye and giving perceived higher color bit-depth. The issue relates to the dithering signal, which increases the high-frequency low-amplitude part of the frequency spectrum which is not easy to compress and adds a lot of overhead.

To overcome the above-mentioned problem the following computations are performed: 1) increase the bit-depth resolution, which will be more than the resolutions that the expected destination may support (only a few bits extra might be enough). 2) Smooth out the dithering into more color values by using high-frequency low-amplitude filtering in the frequency domain. 3) Compress the image at a higher compression rate. Large rounding errors and compression artifacts at this bit-depth will be subsequently scaled down to a lower bit-depth with post-process dithering applied on the decoding side. As the dithering can be treated similar to noise, having high noise levels due to the high compression rate can be desired in some cases. Compressing smother non-dithered transitions is much more compression-friendly and produces improved storage savings and compression. 4) Scaling down from higher bit-depth to lower bit-depth will produce error deltas for each pixel. The delta value represents the difference between the ideal high bit-depth value compared to the real value that is possible to display on a destination device. 5) Use a script to correct the error deltas and produce minute alterations to the lower bit-depth image. This will allow post-process decode dithering, other noise functions, and smoothing algorithms to evolve and expand the life-span of the compression image container without having to update the container implementation.

An intermediate file may include a larger canvas. Multiple panning images combined into a single image require a larger resolution. Partial foreground removal can be applied optionally, which will produce one common background. In case the foreground overlaps the background on the images, then full foreground removal is not necessary as the images will be producing themselves (the existing images) and never any new images. If some part of the background is always obscured, then it does not need to be generated.

For the higher-dimension images, many compression algorithms are used for transforming information from the spatial domain into a frequency domain. Audio compression usually does it at 1D data, images 2D data, while combining sequences of multiple 2D images together forms a 3D image. Compressing the 3D image is very effective if the sequence of the images doesn't change much. Then decoding/producing a specific image from the reference will take a specific 2D slice image from the 3D image.

The disclosed techniques provide better performance and better power consumption efficiency. The compression image containers may support any input format, intermediate format, and output format depending on the desired license requirements of the current implementation of the compression image container. This may allow various implementations to coexist with various features at various costs, and enable easier revisions of a compression image container for integrating newer formats and algorithms and the metadata of each image is saved.

In some embodiments, a method is provided. The method includes adding images into a processing queue for subsequent compression into compression image containers; and in response to detecting a processing trigger event, processing the images within the processing queue, wherein for each image within the processing queue: evaluating the image to identify a compression image container into which the image is to be compressed, wherein heuristics are used to select an existing compression image container or create a new compression image container as the compression image container; and compressing the image into the compression image container by: determining a service level specifying accuracy and size constraints for the image; and compressing the image within the compression image container according to the service level.

In some embodiments, the determining the service level comprises selecting the service level from a plurality of service levels that include a first service level specifying a fully compressed image mode and a first accuracy per channel, a second service level specifying a lossless image mode and a second accuracy per channel, and a third service level specify a partially lossless image mode and a third accuracy per channel.

In some embodiments, the method comprises utilizing date-time heuristics to identify the compression image container based upon the compression image container storing images that are created within a timespan of the image being created.

In some embodiments, images are stored within a plurality of compression image containers, and the method comprises storing a first compression level setting within a first compression image container of the plurality of compression image containers, wherein the first compression level setting is associated with a first compression used to compress the first compression image; storing a second compression level setting within a second compression image container of the plurality of compression image containers, wherein the second compression level setting is associated with a second compression used to compress the second compression image container; and applying the second compression level setting for one or more additional compression image containers created from the second compression image container.

In some embodiments, the method comprises receiving a modification for the image; and in response to determining that the image is frequently referenced by one or more other images, retaining an original copy of the image within the compression image container and creating a new copy of the image upon which the modification is applied.

In some embodiments, the method comprises receiving a delete operation targeting the image; in response to determining that a first compression level was used to compress the image, logically deleting the image and physically retaining the image in storage; and in response to determining that a second compression level was used to compress the image, logically and physically deleting the image.

In some embodiments, the compression image container is constrained to storing up to an upper limit of images, and the method comprises searching previously added images within the compression image container for a best fit image as a reference; and compressing the image based upon the reference.

In some embodiments, the method comprises adding metadata, comprising at least one of decoding information, accuracy information, a speed setting, or a global setting, to the image within the compression image container, wherein the global setting is for a compression feature used to compress the image; and utilizing the metadata to provide access to the image stored within the compression image container.

In some embodiments, a computing device is provided. The computing device comprises a memory comprising machine executable code; and a processor coupled to the memory, the processor configured to execute the machine executable code to cause the machine to: identify images to compress into compression image containers; and process the images, wherein for each image: evaluate the image to identify a compression image container into which the image is to be compressed, wherein heuristics are used to select an existing compression image container or create a new compression image container as the compression image container; and compress the image into the compression image container by: determining a service level specifying accuracy and size constraints for the image; and compressing the image within the compression image container according to the service level.

In some embodiments, the machine executable code causes the machine to apply one or more adjustment layers to the image to incrementally recreate a reconstructed image of the image.

In some embodiments, the machine executable code causes the machine to utilize an adjustment layer to add or remove an existing image within the compression image container to the image in order to create a reconstructed image of the image.

In some embodiments, the machine executable code causes the machine to apply an adjustment layer to the image in order to create a reconstructed image of the image, wherein the adjustment layer is applied to perform at least one of geometry changes or transformations for creating the reconstructed image.

In some embodiments, the machine executable code causes the machine to apply a procedural adjustment layer to the image in order to create a reconstructed image of the image, wherein the procedural adjustment layer is applied to execute an algorithm or script for creating the reconstructed image.

In some embodiments, the machine executable code causes the machine to apply a reference from the image to one or more other images within the compression image container that have a smaller index than the image, wherein the image references itself with an adjustment layer and the one or more images.

In some embodiments, the machine executable code causes the machine to apply a reference from the image to itself to reconstruct at least one of shadows, reflections, or other objects based upon a transfer adjustment layer.

In some embodiments, the machine executable code causes the machine to increase a bit-depth resolution for the image; smooth dithering into color values using high-frequency low-amplitude filtering; compress the image according to a compression rate; scale down the image from a higher bit-depth to a lower bit-depth to generate a lower bit-depth image; and execute a script to handle error deltas and apply alterations to the lower bit-depth image.

In some embodiments, a non-transitory machine readable medium is provided. The non-transitory machine readable medium comprises instructions for performing a method, which when executed by a machine, causes the machine to: evaluate, utilizing heuristics, a first image to select a compression image container from a plurality of existing compression image containers; compress the first image into the compression image container by: determining a first service level specifying constraints for the first image; and compressing the first image with one or more other images within the compression image container according to the service level; evaluate, utilizing the heuristics, a second image to determine that a new compression image container is to be created for compressing the second image into the new compression image container; and create the new compression imagine container and compressing the second image into the new compression image container.

In some embodiments, the instructions cause the machine to: increase a bit-depth resolution for the first image.

In some embodiments, the instructions cause the machine to: smooth dithering into color values using high-frequency low-amplitude filtering; and compress image according to a compression rate.

In some embodiments, the instructions cause the machine to: scale down the image from a higher bit-depth to a lower bit-depth to generate a lower bit-depth image; and execute a script to handle error deltas and apply alterations to the lower bit-depth image.

Figure 9:
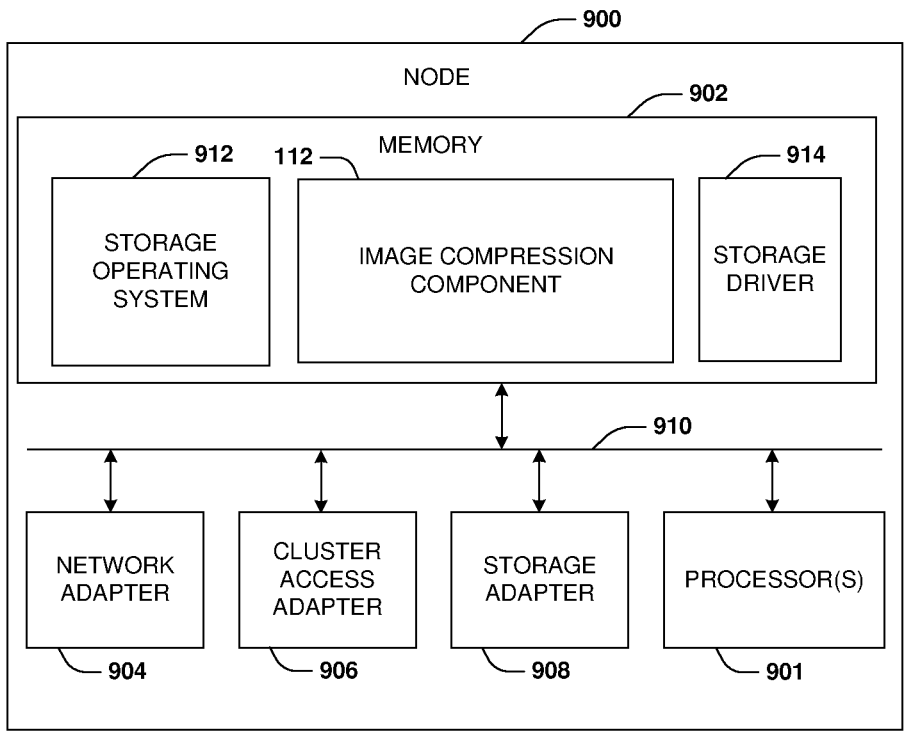
FIG. 9 is a block diagram illustrating an example of a node in accordance with various embodiments of the present technology.

Referring to FIG. 9, a node 900 (also referred to as a storage node) in this particular example includes processor(s) 901, a memory 902, a network adapter 904, a cluster access adapter 906, and a storage adapter 908 interconnected by a system bus 910. In other examples, the node 900 comprises a virtual machine, such as a virtual storage machine.

The node 900 also includes a storage operating system 912 installed in the memory 902 that can, for example, implement a RAID data loss protection and recovery scheme to optimize reconstruction of data of a failed disk or drive in an array, along with other functionality such as deduplication, snapshot creation, data mirroring, synchronous replication, asynchronous replication, encryption, etc.

The network adapter 904 in this example includes the mechanical, electrical and signaling circuitry needed to connect the node 900 to one or more of the client devices over network connections, which may comprise, among other things, a point-to-point connection or a shared medium, such as a local area network. In some examples, the network adapter 904 further communicates (e.g., using Transmission Control Protocol/Internet Protocol (TCP/IP)) via a cluster fabric and/or another network (e.g., a WAN (Wide Area Network)) (not shown) with storage devices of a distributed storage system to process storage operations associated with data stored thereon.

The storage adapter 908 cooperates with the storage operating system 912 executing on the node 900 to access information requested by one of the client devices (e.g., to access data on a data storage device managed by a network storage controller). The information may be stored on any type of attached array of writeable media such as magnetic disk drives, flash memory, and/or any other similar media adapted to store information.

In exemplary data storage devices, information can be stored in data blocks on disks. The storage adapter 908 can include I/O interface circuitry that couples to the disks over an I/O interconnect arrangement, such as a storage area network (SAN) protocol (e.g., Small Computer System Interface (SCSI), Internet SCSI (ISCSI), hyperSCSI, Fiber Channel Protocol (FCP)). The information is retrieved by the storage adapter 908 and, if necessary, processed by the processor(s) 901 (or the storage adapter 908 itself) prior to being forwarded over the system bus 910 to the network adapter 904 (and/or the cluster access adapter 906 if sending to another node computing device in the cluster) where the information is formatted into a data packet and returned to a requesting one of the client devices and/or sent to another node computing device attached via a cluster fabric. In some examples, a storage driver 914 in the memory 902 interfaces with the storage adapter to facilitate interactions with the data storage devices.

The storage operating system 912 can also manage communications for the node 900 among other devices that may be in a clustered network, such as attached to the cluster fabric. Thus, the node 900 can respond to client device requests to manage data on one of the data storage devices or storage devices of the distributed storage system in accordance with the client device requests.

A file system module of the storage operating system 912 can establish and manage one or more file systems including software code and data structures that implement a persistent hierarchical namespace of files and directories, for example. As an example, when a new data storage device (not shown) is added to a clustered network system, the file system module is informed where, in an existing directory tree, new files associated with the new data storage device are to be stored. This is often referred to as "mounting" a file system.

In the example node 900, memory 902 can include storage locations that are addressable by the processor(s) 901 and adapters 904, 906, and 908 for storing related software application code and data structures. The processor(s) 901 and adapters 904, 906, and 908 may, for example, include processing elements and/or logic circuitry configured to execute the software code and manipulate the data structures.

The storage operating system 912, portions of which are typically resident in the memory 902 and executed by the processor(s) 901, invokes storage operations in support of a file service implemented by the node 900. Other processing and memory mechanisms, including various computer readable media, may be used for storing and/or executing application instructions pertaining to the techniques described and illustrated herein.

In some embodiments, the image compression component 112 is implemented by the node 900 in order to compress images using compression image containers.

The examples of the technology described and illustrated herein may be embodied as one or more non-transitory computer or machine readable media, such as the memory 902, having machine or processor-executable instructions stored thereon for one or more aspects of the present technology, which when executed by processor(s), such as processor(s) 901, cause the processor(s) to carry out the steps necessary to implement the methods of this technology, as described and illustrated with the examples herein. In some examples, the executable instructions are configured to perform one or more steps of a method described and illustrated later.

Figure 10:
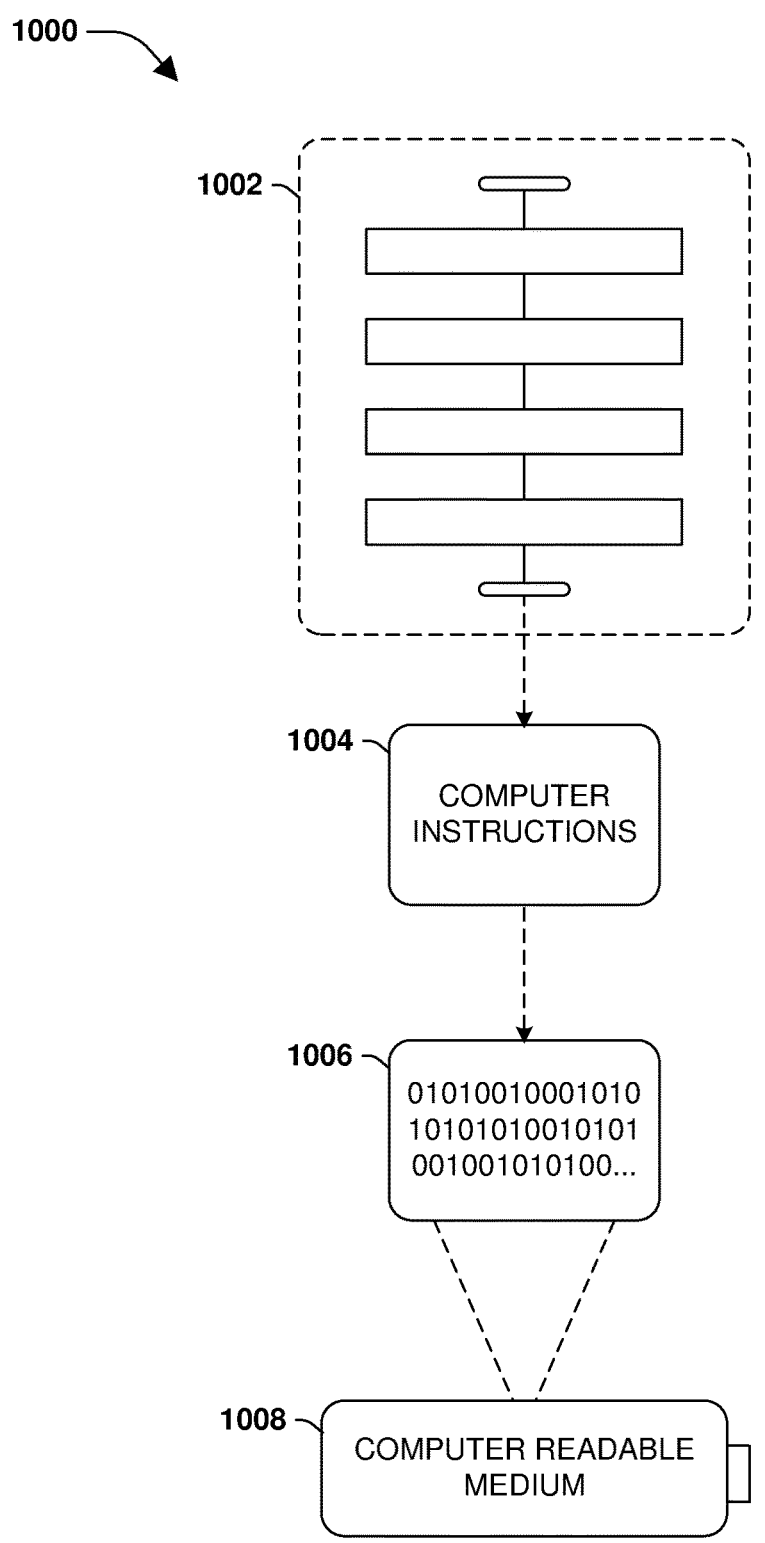
FIG. 10 is an example of a computer readable medium in accordance with various embodiments of the present technology.

FIG. 10 is an example of a computer readable medium 1000 in which various embodiments of the present technology may be implemented. An example embodiment of a computer-readable medium or a computer-readable device that is devised in these ways is illustrated in FIG. 10, wherein the implementation comprises a computer-readable medium 1008, such as a compact disc-recordable (CD-R), a digital versatile disc-recordable (DVD-R), flash drive, a platter of a hard disk drive, etc., on which is encoded computer-readable data 1006. The computer-readable data 1006, such as binary data comprising at least one of a zero or a one, in turn comprises processor-executable computer instructions 1004 configured to operate according to one or more of the principles set forth herein. In some embodiments, the processor-executable computer instructions 1004 are configured to perform at least some of the exemplary methods 1002 disclosed herein, such as method 200 of FIG. 2, for example. In some embodiments, the processor-executable computer instructions 1004 are configured to implement a system, such as at least some of the exemplary systems disclosed herein, such as system 100 of FIGS. 1A-1D, for example. Many such computer-readable media are contemplated to operate in accordance with the techniques presented herein.

In some embodiments, the described methods and/or their equivalents may be implemented with computer executable instructions. Thus, in some embodiments, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In some embodiments, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM) s, CD-Rs, compact disk re-writeable (CD-RW) s, DVDs, magnetic tape, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:

adding images into a processing queue for subsequent compression into compression image containers; and in response to detecting a processing trigger event, processing the images within the processing queue, wherein for each image within the processing queue:

evaluating the image to identify a compression image container into which the image is to be compressed, wherein heuristics are used to select an existing compression image container or create a new compression image container as the compression image container; and compressing the image into the compression image container by:

determining a service level specifying accuracy and size constraints for the image; and compressing the image within the compression image container according to the service level.

2. The method of claim 1, wherein the determining the service level comprises:

selecting the service level from a plurality of service levels that include a first service level specifying a fully compressed image mode and a first accuracy per channel, a second service level specifying a lossless image mode and a second accuracy per channel, and a third service level specify a partially lossless image mode and a third accuracy per channel.

3. The method of claim 1, comprising:

utilizing date-time heuristics to identify the compression image container based upon the compression image container storing images that are created within a timespan of the image being created.

4. The method of claim 1, wherein images are stored within a plurality of compression image containers, and wherein the method comprises:

storing a first compression level setting within a first compression image container of the plurality of compression image containers, wherein the first compression level setting is associated with a first compression used to compress the first compression image container;

storing a second compression level setting within a second compression image container of the plurality of compression image containers, wherein the second compression level setting is associated with a second compression used to compress the second compression image container; and applying the second compression level setting for one or more additional compression image containers created from the second compression image container.

5. The method of claim 1, comprising:

receiving a modification for the image; and in response to determining that the image is frequently referenced by one or more other images, retaining an original compressed copy of the image within the compression image container and creating a new copy of the image upon which the modification is applied.

6. The method of claim 1, comprising:

receiving a delete operation targeting the image;

in response to determining that a first compression level was used to compress the image, logically deleting the image and physically retaining the image in storage; and in response to determining that a second compression level was used to compress the image, logically and physically deleting the image.

7. The method of claim 1, wherein the compression image container is constrained to storing up to an upper limit of images, and wherein the compressing the image comprises:

searching previously added images within the compression image container for a best fit image as a reference; and compressing the image based upon the reference.

8. The method of claim 1, comprising:

adding metadata, comprising at least one of decoding information, accuracy information, a speed setting, or a global setting, to the image within the compression image container, wherein the global setting is for a compression feature used to compress the image; and utilizing the metadata to provide access to the image stored within the compression image container.

9. A computing device, comprising:

a memory comprising machine executable code; and a processor coupled to the memory, the processor configured to execute the machine executable code to cause the machine to:

identify images to compress into compression image containers; and process the images, wherein for each image:

evaluate the image to identify a compression image container into which the image is to be compressed, wherein heuristics are used to select an existing compression image container or create a new compression image container as the compression image container; and compress the image into the compression image container by:

determining a service level specifying accuracy and size constraints for the image; and compressing the image within the compression image container according to the service level.

10. The computing device of claim 9, wherein the machine executable code causes the machine to:

apply one or more adjustment layers to the image to incrementally recreate a reconstructed image of the image.

11. The computing device of claim 9, wherein the machine executable code causes the machine to:

utilize an adjustment layer to add or remove an existing image within the compression image container to the image in order to create a reconstructed image of the image.

12. The computing device of claim 9, wherein the machine executable code causes the machine to:

apply an adjustment layer to the image in order to create a reconstructed image of the image, wherein the adjustment layer is applied to perform at least one of geometry changes or transformations for creating the reconstructed image.

13. The computing device of claim 9, wherein the machine executable code causes the machine to:

apply a procedural adjustment layer to the image in order to create a reconstructed image of the image, wherein the procedural adjustment layer is applied to execute an algorithm or script for creating the reconstructed image.

14. The computing device of claim 9, wherein the machine executable code causes the machine to:

apply a reference from the image to one or more other images within the compression image container that have a smaller index than the image, wherein the image references itself with an adjustment layer and the one or more other images.

15. The computing device of claim 9, wherein the machine executable code causes the machine to:

apply a reference from the image to itself to reconstruct at least one of shadows, reflections, or other objects based upon a transfer adjustment layer.

16. The computing device of claim 9, wherein the machine executable code causes the machine to:

increase a bit-depth resolution for the image;
smooth dithering into color values using high-frequency low-amplitude filtering;

compress the image according to a compression rate;
scale down the image from a higher bit-depth to a lower bit-depth to generate a lower bit-depth image; and
execute a script to handle error deltas and apply alterations to the lower bit-depth image.

17. A non-transitory machine readable medium comprising instructions for performing a method, which when executed by a machine, causes the machine to:

evaluate, utilizing heuristics, a first image to select a compression image container from a plurality of existing compression image containers;

compress the first image into the compression image container by:

determining a first service level specifying constraints for the first image; and compressing the first image with one or more other images within the compression image container according to the service level;

evaluate, utilizing the heuristics, a second image to determine that a new compression image container is to be created for compressing the second image into the new compression image container; and create the new compression imagine container and compress the second image into the new compression image container.

18. The non-transitory machine readable medium of claim 17, wherein the instructions cause the machine to:

increase a bit-depth resolution for the first image.

19. The non-transitory machine readable medium of claim 18, wherein the instructions cause the machine to:

smooth dithering into color values using high-frequency low-amplitude filtering; and compress image according to a compression rate.

20. The non-transitory machine readable medium of claim 19, wherein the instructions cause the machine to:

scale down the image from a higher bit-depth to a lower bit-depth to generate a lower bit-depth image; and execute a script to handle error deltas and apply alterations to the lower bit-depth image.

* * * * *